US012559029B2

(12) United States Patent
Okano

(10) Patent No.: US 12,559,029 B2
(45) Date of Patent: Feb. 24, 2026

(54) OUTER MIRROR

(71) Applicant: TOYOTA JIDOSHA KABUSHIKI KAISHA, Toyota (JP)

(72) Inventor: Masayuki Okano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 18/452,846

(22) Filed: Aug. 21, 2023

(65) Prior Publication Data

US 2024/0198906 A1    Jun. 20, 2024

(30) Foreign Application Priority Data

Dec. 14, 2022    (JP) ................................. 2022-199527

(51) Int. Cl.
B60R 1/06            (2006.01)
(52) U.S. Cl.
CPC ..................................... B60R 1/06 (2013.01)
(58) Field of Classification Search
CPC ........................................................ B60R 1/06
See application file for complete search history.

(56) References Cited

U.S. PATENT DOCUMENTS 5,621,577 A  *  4/1997  Lang ..................... B60R 1/0605
                                                        359/872
9,937,862 B2 *  4/2018  Sawada .................... B60Q 1/34

FOREIGN PATENT DOCUMENTS

JP              3080612 U   * 10/2001
JP         2002-326541 A     11/2002
JP         2004-196019 A      7/2004
JP         2017-007447 A      1/2017

* cited by examiner

*Primary Examiner* — Mustak Choudhury
(74) *Attorney, Agent, or Firm* — SoraIP, Inc.

(57) ABSTRACT

The outer mirror includes a mirror plate and a mirror visor surrounding the mirror plate. The mirror visor has a peripheral wall portion facing the peripheral edge of the mirror plate with a gap therebetween. A peripheral groove extending along the direction in which the peripheral edge extends is formed in the peripheral edge of the mirror plate. The peripheral groove has a triangular cross-sectional shape and opens toward the peripheral wall portion.

3 Claims, 2 Drawing Sheets

OUTER MIRROR

CROSS-REFERENCE TO RELATED APPLICATION

This application claims priority to Japanese Patent Application No. 2022-199527 filed on Dec. 14, 2022, incorporated herein by reference in its entirety.

BACKGROUND

1. Technical Field

The present disclosure relates to a mirror for visually recognizing the surroundings of a vehicle, such as the rear of a vehicle, and more particularly, to an outer mirror attached to the outside of a vehicle body.

2. Description of Related Art

The vehicle is provided with a mirror for visually recognizing the surroundings of the vehicle such as the rear. A mirror provided outside the vehicle body is an outer mirror. Typical outer mirrors of passenger cars are, for example, door mirrors mounted on the doors of the right and left front seats and fender mirrors mounted on the right and left front fenders.

The following Japanese Unexamined Patent Application Publication No. 2004-196019 (JP 2004-196019 A) describes wind noise generated by an outer mirror (10) for a vehicle. The outer mirror (10) includes a cover (14) that covers a mirror body (12) from a vehicle front side, and a visor (16) that is disposed on an inner peripheral portion of the cover (14) and supports the mirror body (12). On the outer surface of the outer mirror (10), on the boundary between the cover (14) and the visor (16), a parting portion (30) is formed, and a cavity portion (K) surrounded by the cover (14) and the visor (16) is formed adjacent to the parting portion (30). When an airflow (W) caused by the traveling of the vehicle hits the parting portion (30), the airflow (W) resonates with the cavity portion (K) adjacent to the parting portion (30). Then, wind noise is generated.

Note that the reference numerals in parentheses above are the reference numerals used in JP 2004-196019 A below, and do not relate to the reference numerals used in the description of the embodiments of the present application.

SUMMARY

In an outer mirror including: a mirror plate including a mirror surface on one surface; and a mirror visor surrounding the mirror plate and defining an internal space cooperatively with the mirror plate, wind noise is generated by an airflow flowing through a gap between the mirror plate and the mirror visor. The vibration of the airflow flowing through the gap resonates with the internal space of the outer mirror, and the wind noise increases.

An object of the present disclosure is to reduce wind noise caused by a gap between a mirror plate and a mirror visor.

An outer mirror according to the present disclosure includes: a mirror plate including a mirror surface on one surface; and a mirror visor that defines an internal space cooperatively with the mirror plate, the mirror visor including a peripheral wall portion surrounding a periphery of the mirror plate.

In at least a part of a peripheral edge of the mirror plate facing the peripheral wall portion with a gap between the peripheral edge and the peripheral wall portion, a peripheral groove extending along a direction in which the peripheral edge extends is provided.

The peripheral groove provided in the peripheral edge of the mirror plate reduces wind noise generated by an airflow passing through a gap between the mirror plate and the mirror visor.

In the outer mirror as described above, the peripheral groove may become narrower in width from an opening toward a bottom.

The sound waves repeatedly reflected in the peripheral groove are attenuated. Then, the wind noise is reduced.

In the outer mirror as described above, the peripheral groove may be provided over an entire periphery of the peripheral edge of the mirror plate.

By providing the peripheral groove in the peripheral edge of the mirror plate, the wind noise generated by the airflow passing through the gap between the mirror plate and the mirror visor is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the following description, unless otherwise specified, terms representing relative positions and orientations, such as front, rear, left, right, up, down, etc., represent relative positions and orientations with respect to a vehicle. Further, description will be given based on the case where the outer mirror is in a position during normal use.

Figure 1:
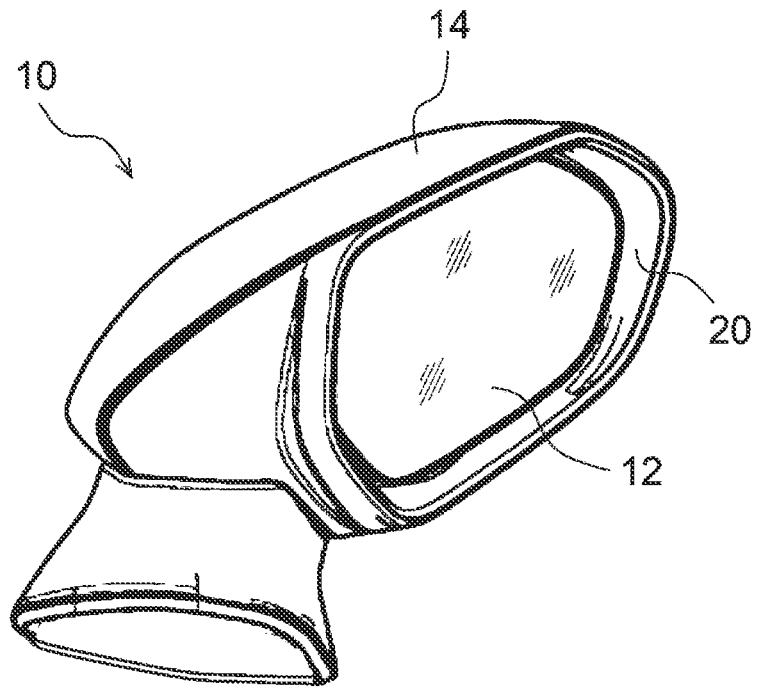
FIG. 1 is a perspective view showing an external appearance of an outer mirror.

FIG. 1 is a perspective view illustrating an external appearance of an outer mirror 10. The outer mirror 10 shown in the figure is a door mirror attached to a door of a front seat of a vehicle. The outer mirror 10 includes a mirror plate 12 having a mirror surface on the entire front side, and a mirror visor 14 surrounding the periphery of the mirror plate 12. The mirror plate 12 has a mirror surface formed of a glass plate, and portions other than the glass plate are made of synthetic resin. The mirror visor 14 is made of synthetic resin. The shape of the mirror visor 14 is a shape having a narrow front and extending rearward, for example, a substantially bell shape. However, the cross-sectional shape orthogonal to the front-rear direction of the mirror visor 14 is not circular like an original bell. In particular, the rear portion has a hexagonal shape that is long in the left-right direction in accordance with the shape of the mirror plate 12. The cross-sectional shape of the mirror visor may be adapted to the shape of the mirror plate. The rear end of the mirror visor 14 is open. A mirror plate 12 is disposed in the opening at the rear end of the mirror visor 14. The rear edge of the mirror visor 14 extends rearward of the mirror plate 12. A portion extending rearward of the mirror visor 14 prevents rainwater and dirt from adhering to the mirror surface of the mirror plate 12. The outer mirror 10 is rotatable between a deployed position protruding laterally from the vehicle body and a position stored along the vehicle body. The laterally deployed position is the position of the outer mirror 10 during normal use.

Figure 2:
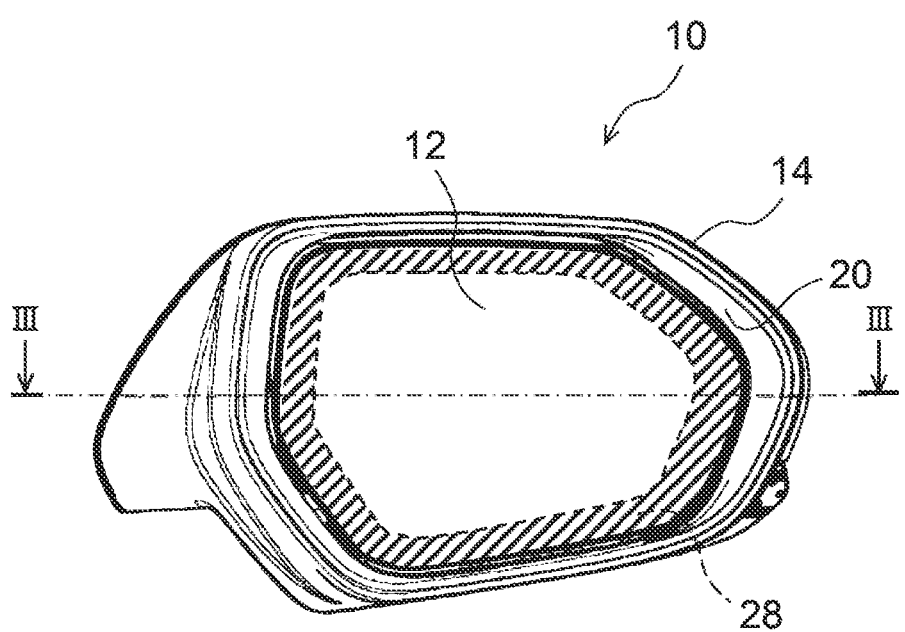
FIG. 2 shows the outer mirror in the use position viewed from the rear.
Figure 3:
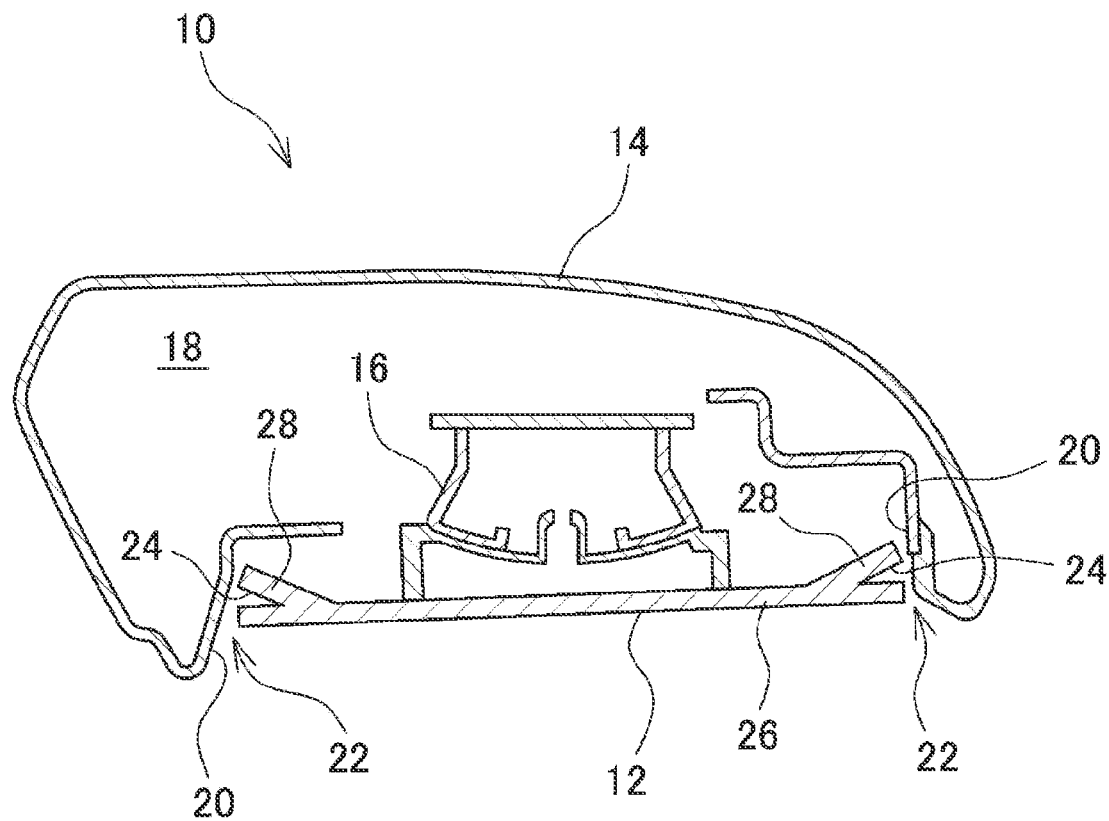
FIG. 3 is a cross-sectional view taken along III-III line shown in FIG. 2.

FIG. 2 is a diagram illustrating a state in which the outer mirror 10 is viewed from behind. FIG. 3 is a cross-sectional view taken along III-III line shown in FIG. 2. The mirror plate 12 has a hexagonal shape that is long in the horizontal direction and has a corner. As described above, the rear end of the mirror visor 14 has a hexagonal shape corresponding to the hexagonal shape of the mirror plate 12. The mirror plate 12 is supported by a support mechanism 16 fixed to the mirror visor 14. The support mechanism 16 supports the mirror plate 12 so as to be tiltable up and down and left and right. Further, the mirror plate 12 is tiltable in an oblique direction by simultaneously tilting vertically and horizontally. In FIG. 3, the support mechanism 16 is shown in a simplified and partially omitted manner.

The mirror plate 12 and the mirror visor 14 cooperate to define an internal space 18 for accommodating the instrument. In FIG. 3, the device accommodated in the internal space 18 is omitted. The apparatus is, for example, a mirror plate tilting mechanism that tilts the mirror plate 12 up, down, left, and right. The internal space 18 may further include an outer mirror opening/closing mechanism. The outer mirror opening/closing mechanism rotationally drives the outer mirror 10 between a deployed position and a stored position.

The mirror visor 14 has a peripheral wall portion 20 surrounding the periphery of the mirror plate 12. The peripheral wall portion 20 is provided so as to face the peripheral edge of the mirror plate 12 even when the mirror plate 12 is tilted. In other words, the dimension of the peripheral wall portion 20 in the front-rear direction is equal to or larger than the movable range of the peripheral edge of the mirror plate 12 in the front-rear direction. A gap 22 is formed between the peripheral edge of the mirror plate 12 and the peripheral wall portion 20. By providing the gap 22, the mirror plate 12 can tilt without interfering with the peripheral wall portion 20.

Figure 4:
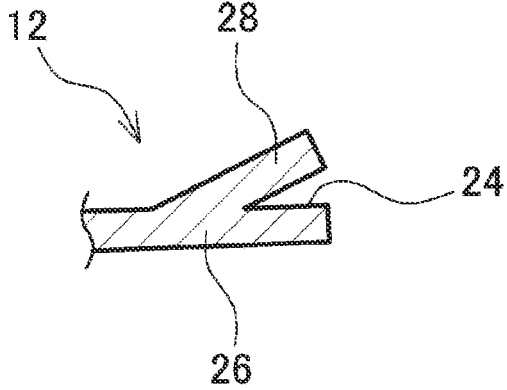
FIG. 4 is a cross-sectional view showing a peripheral edge of mirror plate.

FIG. 4 is an enlarged cross-sectional view of a peripheral edge of the mirror plate 12. With reference to FIGS. 3 and 4, the structure of the peripheral portion of the mirror plate 12 will be described. A peripheral groove 24 extending along the circumferential direction is formed in a peripheral edge of the mirror plate 12. The peripheral groove 24 may be formed over the entire periphery of the periphery of the mirror plate 12. The peripheral groove 24 is formed by a substantially flat mirror plate main body portion 26 having a mirror surface formed on one surface of the mirror plate 12, and a peripheral edge addition portion 28 provided on a rear surface of the mirror plate main body portion 26, that is, a surface opposite to the mirror surface. A space between the mirror plate main body portion 26 and the peripheral edge addition portion 28 is a peripheral groove 24. The peripheral edge addition portion 28 is disposed in a portion of FIG. 2 which is hatched. That is, the peripheral edge addition portion 28 has a substantially hexagonal ring shape. Further, as shown in FIGS. 3 and 4, the peripheral edge addition portion 28, in a cross section including the radial direction of the mirror plate 12, from a portion slightly inner from the peripheral edge of the mirror plate main body portion 26, is disposed to extend obliquely with respect to the mirror plate main body portion 26. The edge of the peripheral edge addition portion 28 is separated from the peripheral edge portion of the mirror plate main body portion 26. The cross section of the peripheral portion of the mirror plate 12 is substantially the same as the cross section shown in FIG. 4 along the circumferential direction. As a result, a peripheral groove 24 extending along the peripheral edge is formed in the peripheral edge of the mirror plate 12. The peripheral groove 24 has a triangular cross-sectional shape, has an opening facing the peripheral wall portion 20 of the mirror visor 14, and has a narrower width toward the back from the opening. The peripheral groove 24 opens towards the peripheral wall portion 20 and is closed on the opposite side.

When the vehicle travels, air flows around the outer mirror 10. Then, a vortex is generated behind the outer mirror 10. When the airflow caused by the vortex passes through the gap 22 between the mirror plate 12 and the peripheral wall portion 20 of the mirror visor 14, wind noise is generated. In particular, when resonance occurs in the internal space 18, wind noise increases. In the outer mirror 10, the generation of wind noise is suppressed by providing the peripheral groove 24 in the peripheral edge of the mirror plate 12.

When the airflow passes through the gap 22, the airflow passing straight through the gap 22 and the airflow once returning to the gap 22 through the peripheral groove 24 interfere with each other, and the wind noise is suppressed. In addition, the generated sound waves are repeatedly reflected on the wall surfaces on both sides of the peripheral groove 24, and are attenuated every time the sound waves are reflected. Then, wind noise is suppressed.

The peripheral groove 24 may be provided in a part of the peripheral edge of the mirror plate 12. The cross-sectional shape of the peripheral groove 24 is not limited to a triangular shape, and may be any other shape, such as a rectangle, in which the width does not change in the depth direction. In addition, when the thickness of the mirror plate main body portion 26 is sufficient, a groove may be formed in the peripheral edge of the mirror plate main body portion 26 without providing the peripheral edge addition portion 28.

The above-described structure for suppressing wind noise can also be applied to an outer mirror other than a door mirror, for example, a fender mirror.

What is claimed is:

1. An outer mirror comprising:
a mirror plate including a mirror surface on one surface; and
a mirror visor that defines an internal space cooperatively with the mirror plate, the mirror visor including a peripheral wall portion surrounding a periphery of the mirror plate,
wherein at least part of a peripheral edge of the mirror plate that faces the peripheral wall portion with a gap between the peripheral edge and the peripheral wall portion is provided with a peripheral groove formed in the peripheral edge, the peripheral groove being open toward the gap so as to guide airflow along the mirror surface, and
the peripheral groove extending along a direction in which the peripheral edge of the mirror plate extends.

2. The outer mirror according to claim 1, wherein the peripheral groove becomes narrower in width from an opening toward a bottom of the peripheral groove.

3. The outer mirror according to claim 1, wherein the peripheral groove is provided over an entire periphery of the peripheral edge of the mirror plate.

* * * * *